United States Patent
Marmorini

(10) Patent No.: US 10,473,054 B2
(45) Date of Patent: Nov. 12, 2019

(54) METHOD TO CONTROL THE COMBUSTION OF A COMPRESSION IGNITION INTERNAL COMBUSTION ENGINE WITH REACTIVITY CONTROL THROUGH THE INJECTION TEMPERATURE

(71) Applicant: MARMOTORS S.r.l., Arezzo (IT)

(72) Inventor: Luca Marmorini, Arezzo (IT)

(73) Assignee: MARMOTORS S.R.L., Arezzo (IT)

( * ) Notice: Subject to any disclaimer, the term of this patent is extended or adjusted under 35 U.S.C. 154(b) by 0 days.

(21) Appl. No.: 15/743,170

(22) PCT Filed: Jul. 14, 2016

(86) PCT No.: PCT/IB2016/054211
§ 371 (c)(1),
(2) Date: Jan. 9, 2018

(87) PCT Pub. No.: WO2017/009799
PCT Pub. Date: Jan. 19, 2017

(65) Prior Publication Data
US 2018/0340486 A1 Nov. 29, 2018

(30) Foreign Application Priority Data

Jul. 14, 2015 (IT) .......... 102015000033850
Mar. 22, 2016 (IT) .......... 102016000029969

(51) Int. Cl.
*F02D 41/30* (2006.01)
*F02M 53/02* (2006.01)
(Continued)

(52) U.S. Cl.
CPC .......... *F02D 41/3047* (2013.01); *F02B 1/12* (2013.01); *F02B 7/02* (2013.01); *F02B 17/005* (2013.01);
(Continued)

(58) Field of Classification Search
CPC .......... F02D 41/3047; F02D 41/0025; F02D 41/006; F02D 3094/402; F02D 2200/0606;
(Continued)

(56) References Cited

U.S. PATENT DOCUMENTS 6,227,151 B1 * 5/2001 Ma .......... F02B 17/00
123/3
8,256,691 B2 * 9/2012 Bolz .......... F02M 61/166
239/135
(Continued)

FOREIGN PATENT DOCUMENTS

| EP | 2682588 | 1/2014 |
|---|---|---|
| GB | 2 455 865 | 6/2009 |
| JP | 2000 027649 | 1/2000 |

*Primary Examiner* — Mahmoud Gimie
(74) *Attorney, Agent, or Firm* — Leason Ellis LLP

(57) ABSTRACT

Method to control the combustion of a compression ignition engine with reactivity control through the injection temperature; the control method provides for the steps of: establishing a quantity of fuel to be injected into a cylinder; injecting a first fraction of the quantity of fuel fed by a first feed system without active heating devices, preferably equal to at least 70% of the quantity of fuel, at least partially during the intake and/or compression stroke; injecting a second fraction of the quantity of fuel fed by a second feed system provided with at least one active heating device, and equal to the remaining fraction of the quantity of fuel, into the cylinder at the end of the compression stroke and preferably at no more than 60° from the top dead center; and heating the second fraction of the quantity of fuel to an injection temperature of over 100° C., before injecting the second fraction of the quantity of fuel.

21 Claims, 5 Drawing Sheets

(51) Int. Cl.
| | |
|---|---|
| *F02M 53/06* | (2006.01) |
| *F02D 41/40* | (2006.01) |
| *F02M 31/125* | (2006.01) |
| *F02D 35/02* | (2006.01) |
| *F02D 41/00* | (2006.01) |
| *F02B 17/00* | (2006.01) |
| *F02M 31/16* | (2006.01) |
| *F02M 26/28* | (2016.01) |
| *F02B 1/12* | (2006.01) |
| *F02B 7/02* | (2006.01) |

(52) U.S. Cl.
CPC ......... *F02D 35/023* (2013.01); *F02D 41/006* (2013.01); *F02D 41/0025* (2013.01); *F02D 41/3094* (2013.01); *F02D 41/402* (2013.01); *F02M 26/28* (2016.02); *F02M 31/125* (2013.01); *F02M 31/16* (2013.01); *F02M 53/02* (2013.01); *F02M 53/06* (2013.01); *F02D 2200/0606* (2013.01); *Y02T 10/126* (2013.01); *Y02T 10/44* (2013.01)

(58) Field of Classification Search
CPC ...... F02M 26/28; F02M 31/125; F02M 31/16; F02M 53/02; F02M 53/06; F02B 17/005
USPC .......................... 123/299, 431, 304; 239/135
See application file for complete search history.

(56) References Cited

U.S. PATENT DOCUMENTS

| | | | |
|---|---|---|---|
| 2004/0065307 A1* | 4/2004 | Fiveland | F01N 5/02 123/552 |
| 2006/0219215 A1* | 10/2006 | Brachert | F02B 23/08 123/299 |
| 2009/0281709 A1* | 11/2009 | Mallebrein | F02D 35/025 701/104 |
| 2011/0057049 A1 | 3/2011 | Hofbauer et al. | |
| 2011/0132323 A1 | 6/2011 | Surnilla et al. | |
| 2011/0214643 A1* | 9/2011 | Blizard | F02M 53/02 123/468 |
| 2013/0081592 A1 | 4/2013 | Boer et al. | |
| 2013/0104543 A1 | 5/2013 | Zoldak et al. | |
| 2014/0251278 A1 | 9/2014 | De Boer et al. | |
| 2016/0010569 A1* | 1/2016 | Dunn | F02D 41/008 123/304 |

* cited by examiner

METHOD TO CONTROL THE COMBUSTION OF A COMPRESSION IGNITION INTERNAL COMBUSTION ENGINE WITH REACTIVITY CONTROL THROUGH THE INJECTION TEMPERATURE

CROSS REFERENCE TO RELATED APPLICATIONS

The present application is a U.S. National Phase of International Patent Application PCT/IB2016/054211, filed on Jul. 14, 2016, which claims priority to Italian Application No. 102015000033850, filed on Jul. 14, 2015 and Italian Application No. 102016000029969, filed on Mar. 22, 2016, each of which is incorporated by reference as if expressly set forth in their respective entireties herein.

TECHNICAL FIELD

The present invention relates to a method to control the combustion of a compression ignition internal combustion engine with reactivity control through the injection temperature.

BACKGROUND ART

International standards (particularly in America and Europe) relating to limiting emissions of polluting gases produced by motor vehicles, over the next few years have called for a progressive reduction in the emissions that can be released into the atmosphere (in particular a significant reduction of $NO_x$ and of particulate).

Compression ignition internal combustion engines (operating according to the Diesel cycle and using mainly diesel oil as fuel) have particular emission problems.

With appropriate technological upgrades, compression ignition internal combustion engines will be capable of satisfying, also in the future, the emission limitations established by these standards and, at the same time, also have excellent energy efficiency (over 40% in the most modern engines). With appropriate technological upgrades, positive ignition internal combustion engines (operating according to the Otto cycle and mainly using gasoline as fuel) will also be capable of satisfying, in the future, the emission limitations established by these standards; however, positive ignition internal combustion engines have lower energy efficiency (at most 33-34% in the most recent engines). In particular, the energy efficiency of positive ignition internal combustion engines is limited by the fact that, in order to avoid excessive detonation (which in the long term damages the cylinder and the piston), the compression ratio in the cylinders cannot be high.

Increased energy efficiency would lead the automobile market to increasingly use compression ignition internal combustion engines; however, existing refineries (which will continue to operate for many years) will be obliged to produce a certain quantity of gasoline during the oil refining process and therefore a substantial number (if not the majority) of automobile engines must continue to use gasoline as fuel. Consequently, great efforts are being concentrated on increasing the energy efficiency of positive ignition internal combustion engines that use gasoline as fuel.

In the past, to increase the compression ratio (and therefore the energy efficiency) while at the same time preventing excessive detonation, gasolines with additives (typically lead and/or manganese) having a higher octane number have been used; however, the use of these additives is no longer permitted by international standards and therefore other strategies must be found to improve the energy efficiency of positive ignition internal combustion engines.

As it is known, fuels are characterized by two indicators: cetane number and octane number, which are roughly inversely proportional.

Cetane number is an indicator of the behaviour of fuel during ignition; in other words, it expresses the readiness of the fuel to self-ignite, wherein the higher the cetane number is, the greater the readiness will be; instead, while the octane number expresses the anti-detonation property of the fuel. Diesel has a high reactivity (high cetane number and low octane number), while gasoline has a low reactivity (high octane number and low cetane number).

The document US20140251278 discloses the injection, into the cylinder of an internal combustion engine, of fractions of fuel that are appropriately heated through a specific active heater and subsequently injected through a single injector. In US20140251278 all the fractions are heated to the same temperature and substantially have the same reactivity. In particular, the injected mixture must preferably be in supercritical conditions. The main aim is to improve homogenization of the injection in supercritical conditions.

However, this solution has the disadvantage, above all for injections in high pressure environments (exceeding 50 bar) typical of internal combustion engines at the end of the compression stroke. The limitation of using a single injector and above all a single temperature leads to the risk of detonation if hot injection takes place too early (with the consequent need to reduce the compression ratio and therefore the efficiency of the engine) or the need to predominantly inject hot fuel close to the top dead centre, which leads to difficult control of the combustion and the pressure gradient during the first stages of combustion. Moreover, a large quantity injected close to the top dead centre leads to problems of particulate emissions, especially unless very high injection pressures (over 1000 bar) are used.

A positive or compression ignition internal combustion engine is also known to use gasoline as the predominant fraction of fuel (or low reactivity fuel) and a smaller fraction of diesel (or other high reactivity fuel); during the intake stroke gasoline is injected into the cylinder, while at the end of the compression stroke and close to the top dead centre of the piston, a small quantity of diesel or high reactivity fuel (i.e. high cetane number) is injected into the cylinder. In other words, this solution provides for fractionated injection in which two different fuels are injected at two different times.

A solution of this type is, for example, disclosed in the document EP2682588. With this solution, through the injection of a plurality of different fuels into the cylinder, a stratification of concentration and of reactivity is obtained, allowing improved control of combustion triggering, even in the absence of the ignition spark plug. This solution makes it possible to operate with very high compression ratios (typical of compression ignition internal combustion engines) while using a predominant quantity of gasoline as fuel, and without incurring excessive detonation before the injection of the fraction with a high cetane number. However, on the other hand, this solution is very costly and complex to produce, requiring doubling of the fuel supply system: in fact, a first supply system (injectors, pump and tank) is required for the gasoline and a second supply system (injectors, pump and tank) is required for the diesel (or other high reactivity fuel).

DESCRIPTION OF THE INVENTION

The object of the present invention is, therefore, to provide a method to control the combustion of a compression ignition internal combustion engine with reactivity control through the injection temperature that does not have the problems of the state of the art and is also easy and inexpensive to produce.

According to the present invention a method to control the combustion of a compression ignition internal combustion engine with reactivity control through the injection temperature in accordance with the scope of the appended claims is provided.

BRIEF DESCRIPTION OF THE DRAWINGS

The present invention will now be described with reference to the accompanying drawings, which illustrate a non-limiting example of embodiment thereof, wherein.

PREFERRED EMBODIMENTS OF THE INVENTION

Figure 1:
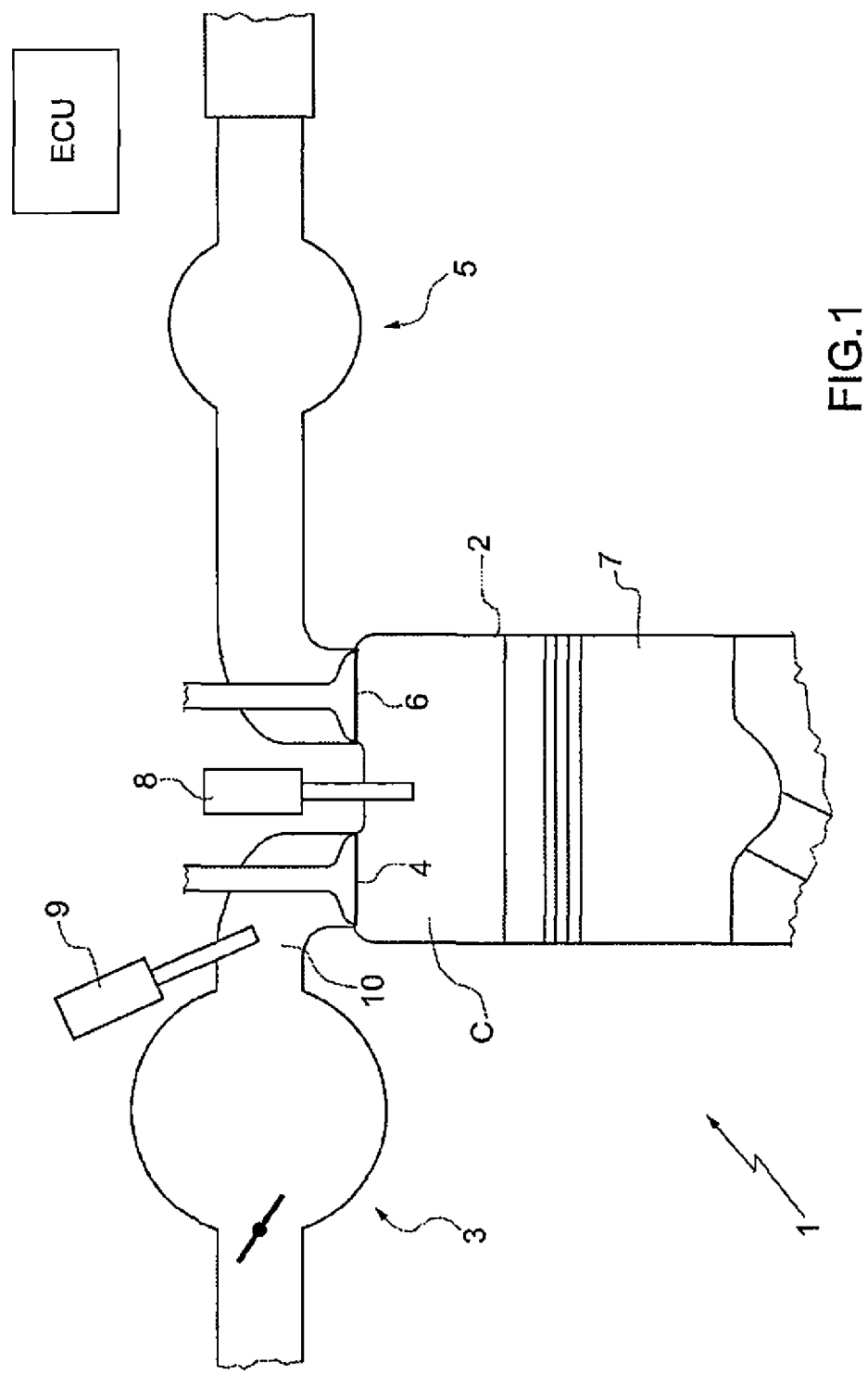
FIGS. 1-4 are schematic views of different embodiments of an internal combustion engine operating according to the method to control combustion forming the subject matter of the present invention.

In FIG. 1, the reference number 1 indicates as a whole an internal combustion engine that uses gasoline as fuel and is provided with a cycle that has at least an intake stroke and a compression stroke.

In the description below, explicit reference will be made, without loss of generality, to the case in which the internal combustion engine 1 is a four-stroke internal combustion engine 1, although the method to control combustion is naturally also applicable to a two-stroke internal combustion engine 1.

In the preferred embodiment, the internal combustion engine 1 is a supercharged internal combustion engine 1, but it could also be a naturally aspirated internal combustion engine 1.

Moreover, the internal combustion engine 1 could be provided with an exhaust gas recirculation system EGR in the intake stroke of the internal combustion engine 1, as will be better described below.

The internal combustion engine 1, illustrated in FIGS. 1-4, is a four-stroke internal combustion engine 1 provided with a plurality of cylinders 2 (only one of which is illustrated in FIG. 1), each of which is connected to an intake manifold 3 through at least one intake valve 4 and to an exhaust manifold 5 through at least one exhaust valve 6.

As it is known, fuels are characterized by two indicators, cetane number and octane number, which can be considered roughly inversely proportional. The cetane number is an indicator of behaviour during ignition of the fuel; in other words, it expresses the readiness of the fuel to self-ignite, where the higher the cetane number is the higher this readiness will be; the cetane number is calculated experimentally by detecting the delay between injection and ignition, assigning a value of 100 to the cetane ($C_{16}H_{34}$) and a value of 0 to the methylnaphathene (or assigning a value of 15 to the isocetane). Analogous to the cetane number is the cetane index, which is calculated taking account of the density and of the volatility of the fuel, which roughly approximates to the cetane number. The octane number expresses the anti-detonation property of the fuel, i.e. it expresses the resistance to self-ignition. Diesel has high reactivity (high cetane number and low octane number), while gasoline has low reactivity (high octane number and low cetane number).

Inside each cylinder 2 there is arranged a piston 7 which is adapted to slide with a reciprocating motion on the inside of the cylinder 2 between a top dead centre TDC and a bottom dead centre BDC. The top dead centre TDC is located in the area of the head of the cylinder 2 on the inside of which the piston 7 slides; in particular, in the point closest to the head or with the smallest volume of a combustion chamber C produced between the crown end of the piston 7 and the cylinder head of the internal combustion engine 1. Instead, the bottom dead centre TDC is at the minimum distance from the block of the internal combustion engine 1, i.e. is the point corresponding to the maximum stroke of the piston 7.

In the preferred embodiment illustrated in FIG. 1, the internal combustion engine 1 is a four-stroke internal combustion engine 1, on the inside of which the piston 7 slides with reciprocating motion inside the cylinder 2 to carry out a series of combustion cycles each comprising the intake stroke, the compression stroke, a power stroke and an exhaust stroke.

The internal combustion engine 1 is provided with an electronic control unit ECU, a detonation detection system, a pressure detection system, a fuel injector 8, a fuel injector 9 and/or a fuel injector 11. The fuel injector 8 and the fuel injector 11, if present, are adapted to inject gasoline directly into the cylinder 2; while, the fuel injector 9, if present, is adapted to inject gasoline outside the cylinder 2, i.e. into an intake pipe 10, as will be better explained below.

The electronic control unit ECU is adapted to control fuel injection in terms of a quantity Q of fuel to be injected, degree of fractionation and injection times. For each combustion cycle, the electronic control unit ECU establishes (in a known manner) the quantity Q of fuel (i.e. gasoline) to be injected during the combustion cycle and its fractionation. In particular, as will be better described below, the quantity Q of fuel is divided into a fraction F1 of the quantity Q of fuel and into a fraction F2 of the quantity Q of fuel complementary to one another (i.e. the sum of the two fractions F1 and F2 is equal to the quantity Q of fuel).

The detonation detection system acquires the data concerning detonation in real time. In particular, data coming from a specific sensor (for example a pressure sensor in the combustion chamber C or an accelerometer arranged in the area of the cylinder head of the internal combustion engine 1) will be processed, so as to modify the injection parameters.

If the conditions are as such that they detect detonation (incipient or marked) the electronic control unit ECU will correct the injection phase of the fraction F2 of the quantity Q of fuel according to a priority sequence to prevent detonation. Typically, there will be a variation of the injection timing and a variation of the fraction F2 of the quantity Q of fuel to be injected. Optionally, the electronic control unit ECU could also correct the injection phase of the fraction F1 of the quantity Q of fuel.

When detonation is no longer detected, injection will return to the map values. This system makes it possible to prevent failures linked to heavy detonation (perhaps caused by local overheating) or to create a map offset to prevent damages linked to slight but continuous phenomena of detonation (for example due to gasolines with different properties).

The pressure detection system is adapted to acquire and control the pressure gradient during combustion, so as to prevent noise and mechanical damage of the components; the pressure gradient is kept within defined values through adjustment of the injection parameters via the electronic control unit ECU.

The fuel injector 8 is adapted to inject fuel (i.e. gasoline), which will subsequently be combusted directly in the combustion chamber C produced between the crown end of the piston 7 and the cylinder head of the internal combustion engine 1. Injection is fractionated into two separate injections, which are carried out by the fuel injector 8 and by the fuel injector 9 and/or by the fuel injector 11, as will be better explained below. In particular, as already described above, the quantity Q of fuel is divided into the fraction F1 of the quantity Q of fuel and into the fraction F2 of the quantity Q of fuel complementary to one another (i.e. the sum of the two fractions F1 and F2 is equal to the quantity Q of fuel).

The first injection of the fraction F1 of the quantity Q of fuel is carried out at least partially during the intake and/or compression stroke. In particular, the first injection of the fraction F1 of the quantity Q of fuel could also be carried out partially during the start of the compression stroke. Instead, the second injection of the fraction F2 of the remaining quantity Q of fuel is carried out at the end of the compression stroke (at no more than 60° from the top dead centre TDC). The first injection of the fraction F1 of the quantity Q of fuel is carried out completely during the intake stroke or partially during the intake stroke and the remaining part during the start of the compression stroke (indicatively within 60° to 100° from the bottom dead centre BDC, i.e. no more than 60° from the top dead centre TDC). Instead, the second injection of the fraction F2 of the quantity Q of fuel (which is complementary to the fraction F1 to obtain the quantity Q of fuel) is carried out at the end of the compression stroke at no more than 60° from the top dead centre TDC.

In other words, initially (i.e. during the intake stroke and/or during the start of the compression stroke) the fraction F1 of the quantity Q of fuel that is equal to at least 60% of the quantity Q of fuel, preferably ranging from the 70% to 90% of the quantity Q of fuel, is injected; instead, towards the end of the compression stroke, i.e. slightly before the top dead centre TDC (at no more than 60° from the top dead centre TDC) the remaining fraction F2 of the quantity Q of fuel, which is at most 30% of the quantity Q of fuel, is injected directly into the cylinder 2.

Injection of the fraction F1 of the quantity Q of fuel can take place through a single opening of the fuel injector 9 and/or of the fuel injector 11 or through a plurality of consecutive openings of the fuel injector 9 and/or of the fuel injector 11; i.e., injection of the fraction F1 of the quantity Q of fuel can be divided into several parts that take place in successive points in time. Injection of the fraction F2 of the quantity Q of fuel can take place through a single opening of the fuel injector 8 or through a plurality of consecutive openings of the fuel injector 8; i.e. injection of the fraction F2 of the quantity Q of fuel can be divided into several parts that take place in successive points in time.

Advantageously, the two fractions F1 and F2 of the quantity Q of fuel are injected at two different temperatures.

In particular, the fraction F1 of the quantity Q of fuel is fed by a feed system that does not have active heating devices (as will be better explained below). In this way the fraction F1 of the quantity Q of fuel has a temperature below an injection temperature T.

Instead, the fraction F2 of the quantity Q of fuel is fed by a feed system that is provided with active heating devices, as will be better explained below. The feed system of the fraction F2 of the quantity Q of fuel is separate and independent from the feed system of the fraction F1 of the quantity Q of fuel. As the fraction F2 of the quantity Q of fuel is heated, it is injected at the injection temperature T. The injection temperature T is exceeding 100° C. and preferably ranges from 100° to 420° C.

The electronic control unit ECU establishes (normally through suitable maps determined experimentally) fractionation of the quantity Q of fuel to be injected into the cylinder 2 as a function of the load condition and also establishes (normally through suitable maps determined experimentally) the injection temperature T of the fraction F2 of the quantity Q of fuel (i.e. the injection temperature T to which the fuel of the fraction F2 of the quantity Q of fuel is heated before being injected). In particular, the electronic control unit ECU establishes precisely both the value of the fractions F1 and F2 of the quantity Q of fuel and the related point in time in which the injections are carried out, and the injection temperature T to which to heat the fraction F2 of the quantity Q of fuel before being injected.

In particular, the value of the fractions F1 and F2 of the quantity Q of fuel and the related point in time in which the injections are carried out are established as a function of different variables (such as rpm of the internal combustion engine 1, load condition and injection temperature T).

The fraction F1 of the quantity Q of fuel is injected without any heating (i.e. it is not necessary for the fuel injected into the fraction F1 of the quantity Q of fuel to have a particular temperature). However, due to the compression to which the fraction F1 of the quantity Q of fuel is subjected before injection, involuntary heating to the injection temperature T occurs. In fact, as is known from thermodynamics, a fluid subjected to compression is heated due to the friction work and to the work required to vary the volume of the fluid during its compression. In other words, heating of the fraction F1 of the quantity Q of fuel is not produced with the aid of an active heating device. For gasoline the temperature of the fraction F1 of the quantity Q of fuel is usually below 100° C.

The fraction F2 of the quantity Q of fuel must instead be heated in advance to the injection temperature T, in general ranging from 100° to 420° C., before being injected. This injection temperature T range comprises all possible fuels that could be used, while for gasoline alone the injection temperature T normally ranges from 100° to 350° C. (the upper limit could be slightly higher, but nonetheless below 420° C.). In any case, the precise value of the injection temperature T is established by the electronic control unit ECU both (and mainly) as a function of the fuel used, and as a function of the working conditions (such as the operating point of the engine, the temperature of the cooling liquid of the internal combustion engine 1, the percentage of load, the percentage of exhaust gas recirculation in the case in which the internal combustion engine 1 is provided with exhaust gas recirculation system EGR, the level of supercharging in the case in which the internal combustion engine 1 is supercharged, etc.).

Heating of the fraction F2 of the quantity Q of fuel leads to an increase in its reactivity, i.e. of the cetane number of the fuel. In fact, gasoline (which is the fuel of the internal combustion engine 1) at room temperature has a cetane number below 30; instead, by heating gasoline (which is the fuel of the internal combustion engine 1) the fraction F2 of the quantity Q of fuel has a reactivity equivalent to a typical value number of diesel). In other words, by increasing the temperature (i.e. heating) of the fraction F2 of the quantity Q of fuel it is possible to increase the reactivity of the fraction F2 of the quantity Q of fuel. Besides increasing the reactivity, another effect of the heating of the fraction F2 of the quantity Q of fuel is variation of the diffusivity of the fraction F2 of the quantity Q of fuel; in other words, the injection temperature T has an important effect also in the mixing with air that qualitatively is analogous to the effect of the injection pressure. The injection pressure, given a certain injection temperature T, is used to reach the air-fuel mixing required in terms of penetration and shape of the jet.

From a viewpoint of management and control of the internal combustion engine 1, division of injection of the quantity Q of fuel into a first injection of the fraction F1 of the quantity Q of fuel and a second injection of the fraction F2 of the quantity Q of fuel, means that the fraction F1 of the quantity Q of fuel (equal to at least 70%) produces a mixture that is lean (i.e. with little fuel and therefore, basically little propension to detonation) and basically homogeneous inside the combustion chamber C. In this way, injection of the fraction F2 of the quantity Q of fuel produces stratification both of the concentration of the fuel and also of reactivity inside the combustion chamber C.

Injection of the fraction F1 of the quantity Q of fuel together with the intake air and any exhaust gas recirculation produces a lean mixture (i.e. with little fuel) and makes it possible to prevent the problem of detonation, i.e. of self-ignition of the fuel, during compression, even if there is a high compression ratio (for example ranging from 15 to 20). In other words, even if the compression ratio of the internal combustion engine 1 is high (for example ranging from 15 to 20), as the mixture is very lean, it will not have the local conditions (concentration, temperature and pressure) to self-ignite and therefore to trigger a detonation.

Moreover, as injection of the fraction F2 of the quantity Q of fuel heated takes place at the end of the compression stroke, and in particular, not more than 60° from the top dead centre TDC, injection can take place without the aid of high injection pressures (the injection pressure is generally below 500 bar). Besides this, the fraction F2 of the quantity Q of fuel is heated to the injection temperature T, ranging from 100° to 420° C., and injected at a short distance from the top dead centre TDC; in this way, the fraction F2 of the quantity Q of fuel is in the condition to self-ignite, in other words there is a reduction in the ignition delay of the fuel. Therefore, in internal combustion engines 1 to which the aforesaid control method is applied, the aid of a spark plug, which activates combustion through the electrodes, is optional as the fraction F2 of the quantity Q of fuel that was previously heated to the injection temperature T has a high reactivity (high cetane number) and is therefore able to self-ignite determining successive combustion of all the fuel present in the combustion chamber C (i.e. determines diffused flame triggering that also causes self-ignition conditions of the fraction F1 of the quantity Q of fuel). The internal combustion engine 1 is therefore also capable of operating without an ignition spark plug, which nonetheless could be provided to be used in particular conditions, for example when the internal combustion engine 1 is (very) cold and/or at minimum rpm and/or optionally to increase the combustion stability in transient state with low load.

According to an embodiment that is not the subject matter of the present invention, both injections of the fractions F1 and F2 of the quantity Q of fuel are carried out by the fuel injector 8 arranged centrally with respect to the combustion chamber C. In this way, both the fractions F1 and F2 of the quantity Q of fuel (at different points in time established by the ECU control unit) are injected directly into the combustion chamber C by the same fuel injector 8. In other words, the two fractions F1 and F2 of the quantity Q of fuel are injected directly into the combustion chamber C by the single fuel injector 8 that leads into the cylinder 2 and that heats the fractions F1 and F2 of the quantity Q of fuel and injects them in two different points in time. Injection of the fraction F1 of the quantity Q of fuel can take place at least partially during the intake stroke of the internal combustion engine 1, while injection of the fraction F2 of the quantity Q of fuel takes place a short distance from the end of the compression stroke of the internal combustion engine 1. This solution also makes it possible to generate a certain stratification of concentration and of reactivity between the fractions F1 and F2 of the quantity Q of fuel.

According to the embodiment illustrated in FIG. 1, injection of the fractions F1 and F2 of the quantity Q of fuel is carried out by the two distinct fuel injectors 8 and 9. In particular, injection of the fraction F1 of the quantity Q of fuel (at least 70% of the quantity Q of fuel, preferably ranging from 70 to 90% of the quantity Q of fuel) is carried out by the fuel injector 9 that is arranged upstream of the intake valve 4. In other words, the fuel injector 9 is arranged at the intake pipe 10. Injection of the fraction F2 of the quantity Q of fuel instead takes place through the fuel injector 8 that is arranged centrally with respect to the combustion chamber C and leads into it. In other words, the two fractions F1 and F2 of the quantity Q of fuel are injected in two different positions in the internal combustion engine 1. The fraction F1 of the quantity Q of fuel is injected into the intake pipe 10 by the fuel injector 9 so as to form a mixture with the air, while the fraction F2 of the quantity Q of fuel is injected directly into the combustion chamber C by the fuel injector 8 arranged centrally with respect to the combustion chamber C. In this way, stratification of the concentration and of the reactivity of the charge contained in the combustion chamber C of the internal combustion engine 1 is obtained. With regard to the injection pressures, the fuel injector 8 injects the fuel at a much higher pressure, typically at least 5 times higher, with respect to the injection pressure of the fuel injector 9. For example, the injection pressure of the fuel injector 8 could range from 200 to 500 bar and the injection pressure of the fuel injector 9 could range from 10 to 50 bar.

Figure 2:
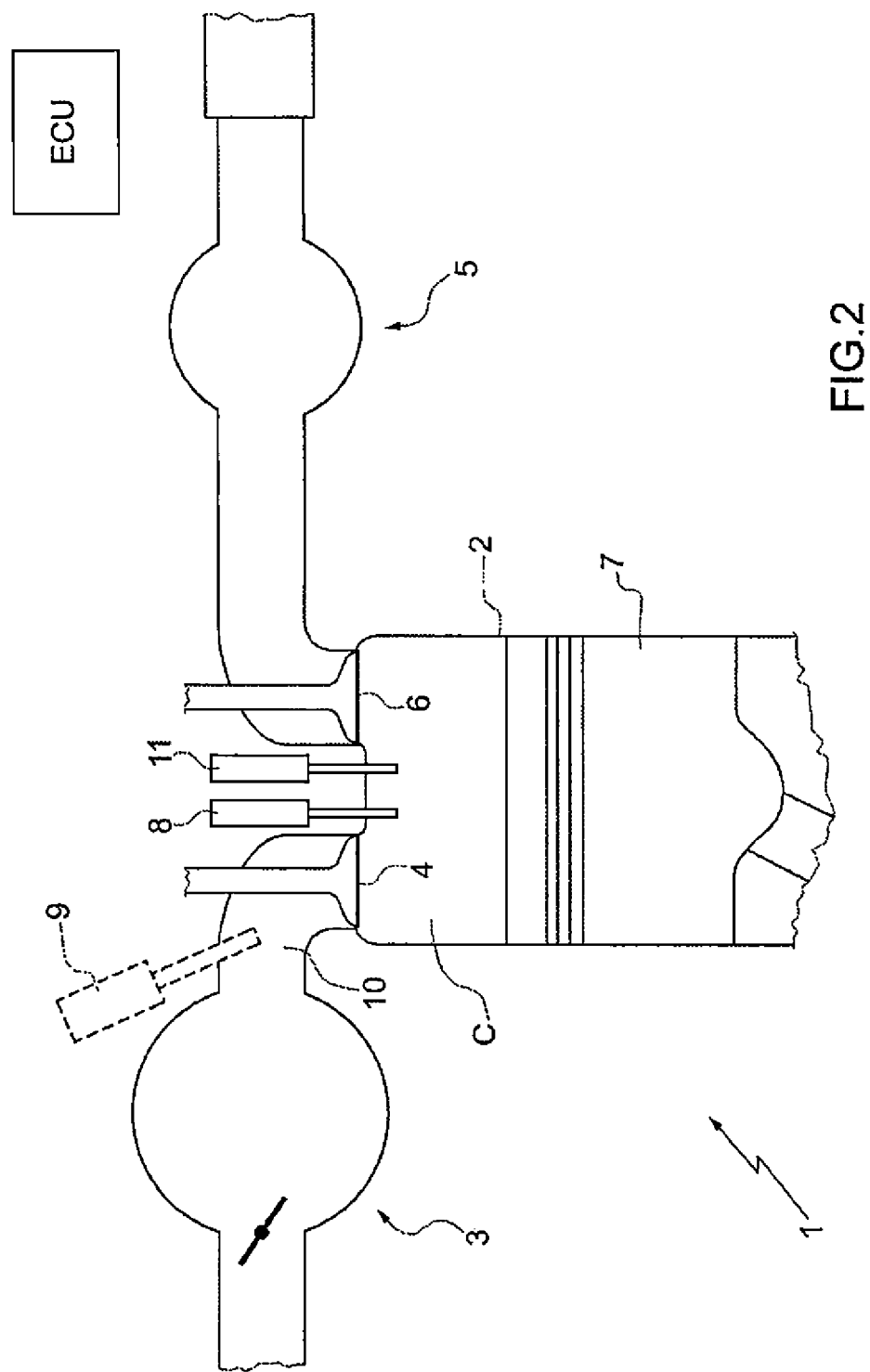
Figure 3:
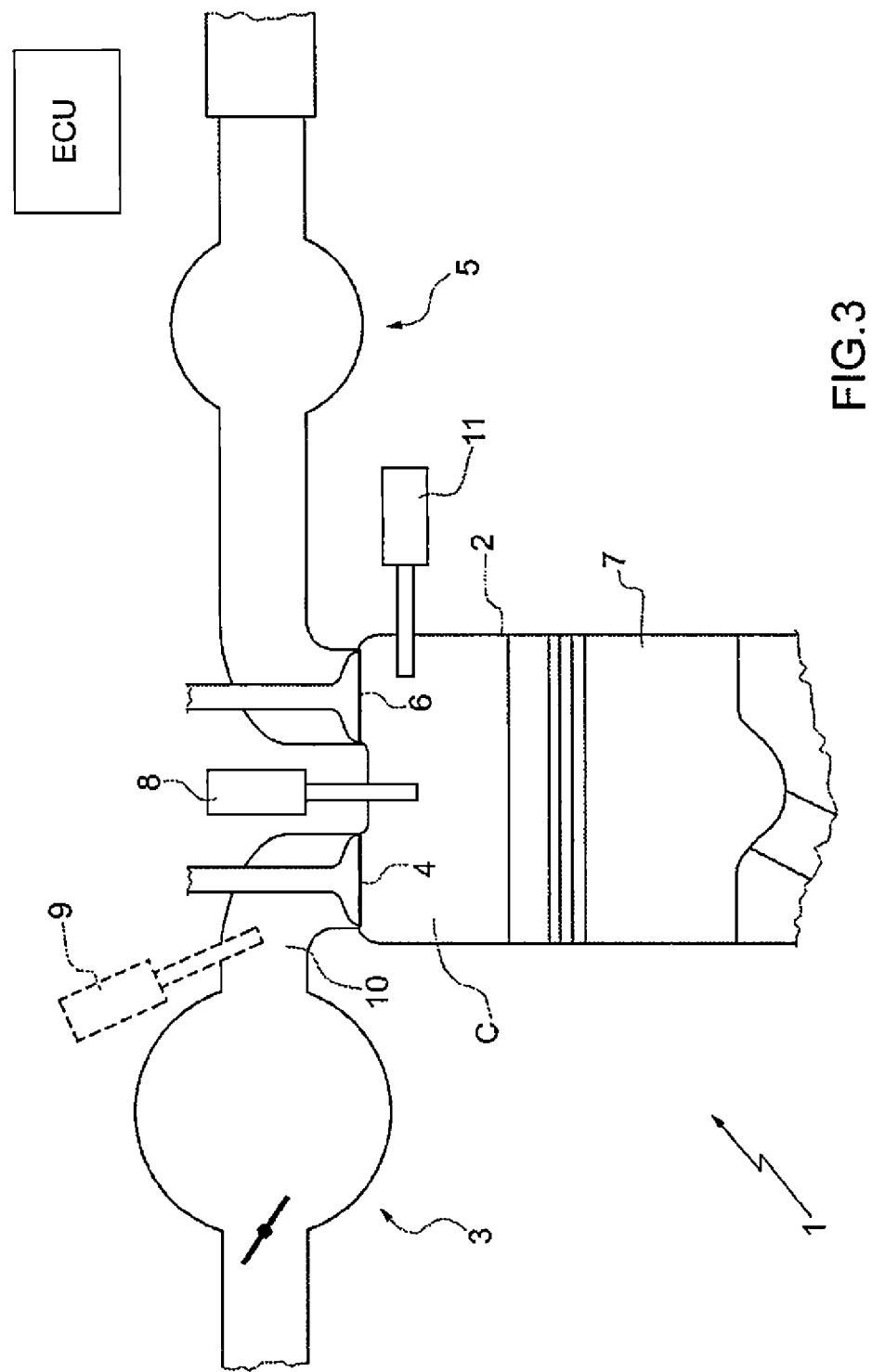

According to other embodiments, illustrated in FIGS. 2 and 3, the fraction F1 of the quantity Q of fuel is injected at least partly directly into the cylinder 2 by the fuel injector 11. In other words, the fuel injector 11 leads directly into the cylinder 2, so as to inject at least partly the fraction F1 of the quantity Q of fuel. Therefore, the two fractions F1 and F2 of the quantity Q of fuel are injected separately by two distinct fuel injectors 8 and 11 that both carry out direct injection into the cylinder 2.

According to a further embodiment, in addition to the injectors 8 and 11, there can also be provided the injector 9 (indicated with a dashed line in FIG. 2) that carries out indirect fuel injection. In this case, injection of an initial part of the fraction F1 of the quantity Q of fuel is carried out by the fuel injector 9, which is arranged upstream of the intake valve 4 during the intake stroke. Subsequently, during the compression stroke, the fraction F2 of the quantity Q of fuel is injected through the fuel injector 8. The remaining part of the fraction F1 of the quantity Q of fuel can be injected through the injector 11 mainly during the compression stroke and before injection of the fraction F2 of the quantity Q of fuel. Alternatively, the remaining part of the fraction F1 of the quantity Q of fuel can be injected mainly before injection of the fraction F2 of the quantity Q of fuel and partly after injection of the fraction F2 of the quantity Q of fuel. In this way, stratification of the charge contained in the combustion chamber C of the internal combustion engine 1 both in terms of concentration and reactivity is obtained.

We must stress that, if the initial part of the fraction F1 of the quantity Q of fuel were to be injected at the start of the compression stroke, this part of the fraction F1 of the quantity Q of fuel would be obligatorily injected by the fuel injector 11 that leads directly into the cylinder 2, and not by the fuel injector 9.

According to what is illustrated in FIGS. 2 and 3, the fuel injector 11 can be arranged in different positions with respect to the cylinder 2. In particular, as illustrated in FIG. 2, the fuel injector 11 can be arranged next to the fuel injector 8. In other words, the fuel injector 8 and the fuel injector 11 are arranged next to one another and both lead into the crown end of the cylinder 2. That is, the fuel injector 8 and the fuel injector 11 inject centrally into the combustion chamber C.

Alternatively, as illustrated in FIG. 3, the fuel injector 11 can lead into a lateral wall of the cylinder 2. In other words, the fuel injector 11 can inject laterally into the combustion chamber C. That is, the fuel injector 11 leads into the combustion chamber C, in a lateral position. In particular, it can inject both in the exhaust side and the intake side of the internal combustion engine 1.

According to the description above, only the fraction F2 of the quantity Q of fuel must be heated to the injection temperature T by an active heating device 12 before being injected. In other words, the fraction F2 of the quantity Q of fuel must be heated to the injection temperature T, so as to increase its reactivity. Instead, the fraction F1 of the quantity Q of fuel is not heated by the heating device 12.

Figure 5:
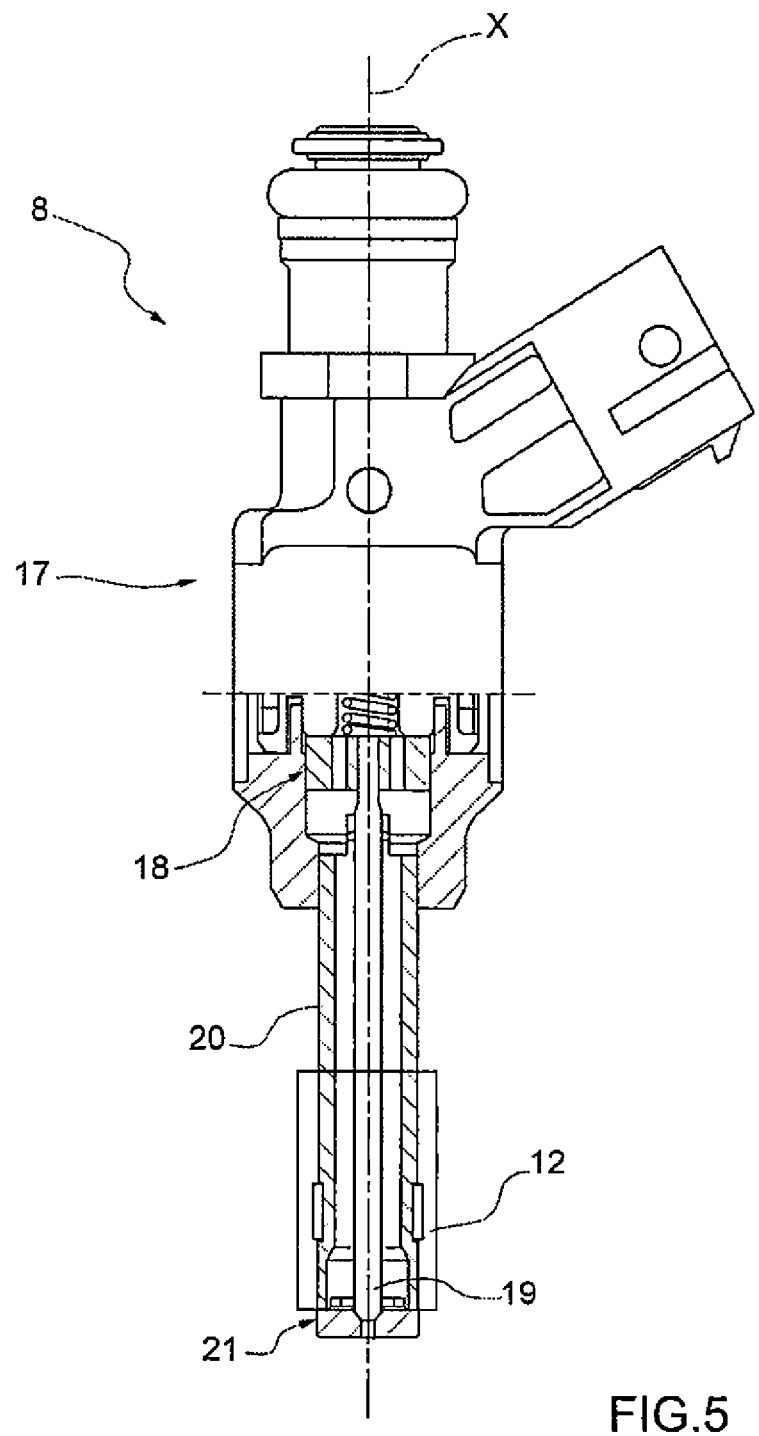
FIG. 5 is schematic and partially sectional view of an injector of the internal combustion engine of FIGS. 1-4.

According to a possible embodiment, the fraction F2 of the quantity Q of fuel can be heated by the heating device 12 coupled to the fuel injector 8, as illustrated in FIG. 5, and as will be better described below.

If injection of the fractions F1 and F2 of the quantity Q of fuel is carried out by the injectors 8 and 9, as illustrated in FIG. 1, then only the fuel injector 8 is provided with the heating device 12. Instead, the fuel injector 9, which carries out indirect injection of the fraction F1 of the quantity Q of fuel, has no fuel heating device 12.

According to a different embodiment that is not the subject matter of the present invention, in addition to the fuel injector 8, the fuel injector 11 can also optionally be provided with the heating device 12. Advantageously, according to this embodiment, the injector 8 and the injector 11 are of the same type, so as to reduce the costs and number of spare parts. Instead, if provided, the fuel injector 9, which carries out indirect injection of the fraction F1 of the quantity Q of fuel, has no fuel heating device 12.

In the case in which the fraction F1 of the quantity Q of fuel injected is to be heated, the fuel injector 11 will heat the respective fraction F1 of the quantity Q of fuel to a lower temperature with respect to the injection temperature T of the fraction F2 of the quantity Q of fuel. Therefore, in this way it is possible to obtain improved stratification of the concentration and reactivity of the charge.

According to the description above, in normal conditions, the fuel injector 11 will not inject preheated fuel and its main effect will be that of stratifying the concentration, ensuring progressive self-ignition of the charge of fuel contained in the combustion chamber C.

According to an embodiment that is not the subject matter of the present invention, only the fuel injector 8 is present, due to the high thermal inertias, the fuel injector 8 would normally heat both fractions F1 and F2 of the quantity Q of fuel, as it would be unable to heat only the fraction F2 of the quantity Q of fuel (i.e. it is incapable of not heating also the fraction F1 of the quantity Q of fuel). Optionally, the fuel injector 8 could be capable of heating the fraction F1 of the quantity Q of fuel to a slightly lesser degree with respect to heating of the fraction F2 of the quantity Q of fuel.

According to a different embodiment, the fraction F2 of the quantity Q of fuel can be heated through an active heating device 13 that is arranged upstream of the fuel injector 8 and downstream of a high pressure feeding pump 14A that is in turn arranged downstream from a low pressure feeding pump 14B that draws fuel from a tank S.

Figure 4:
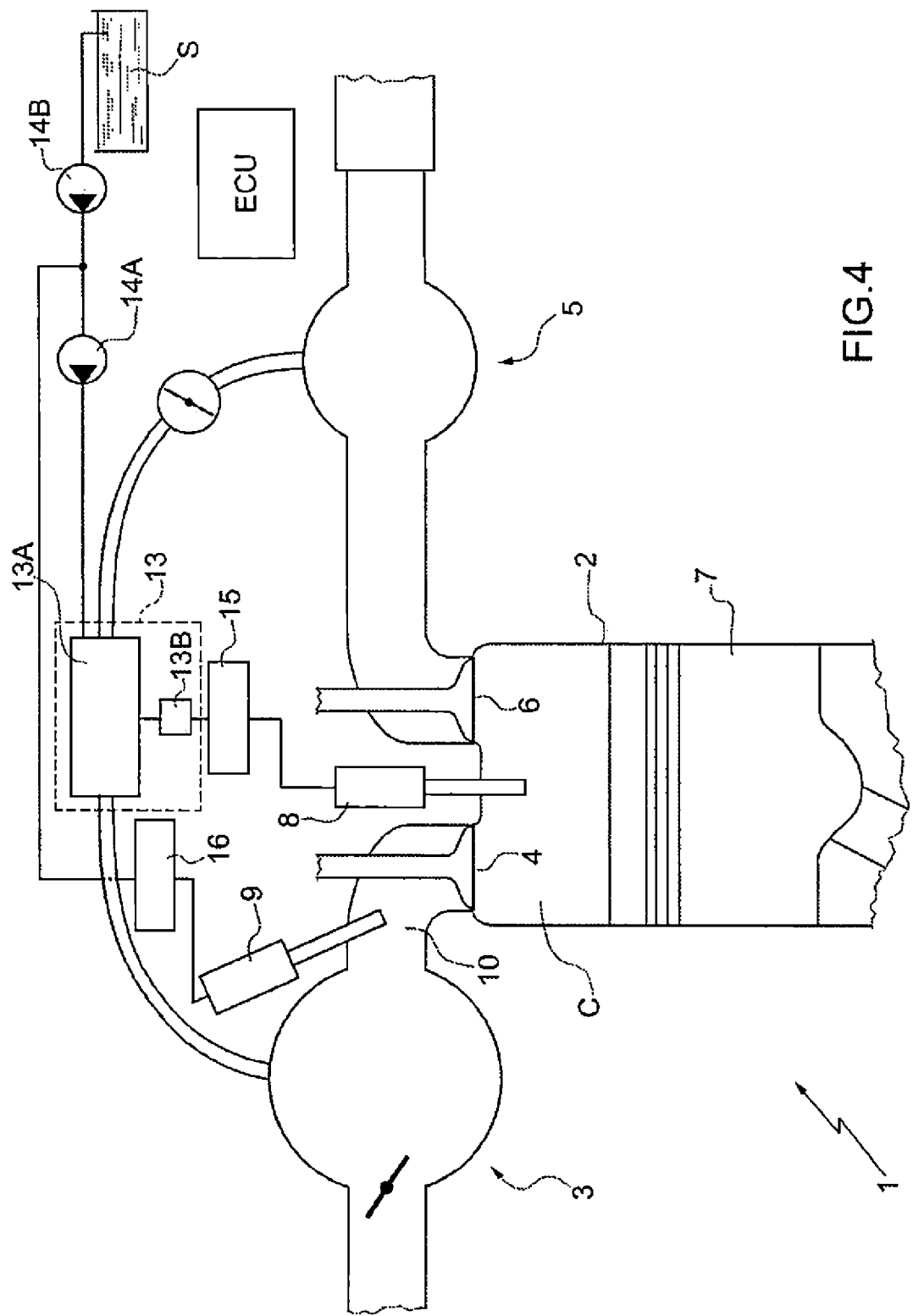

According to the embodiment illustrated in FIG. 4, the internal combustion engine 1 comprises a common rail 15 that receives pressurized fuel from the high pressure feeding pump 14A and feeds pressurized fuel to the injector 8. In this embodiment, the heating device 13 is arranged upstream of the common rail 15, so that in the common rail 15 the fuel already has the desired injection temperature T. From the common rail 15, the heated fuel (i.e. at the desired injection temperature T) is fed to the injector 8 that injects the fraction F2 of the quantity Q of fuel into the cylinder 2.

Moreover, in this embodiment the internal combustion engine 1 comprises a further common rail 16 in which the fuel is at room temperature (i.e. is not heated by an active heating device). If the common rail 16, as illustrated in FIG. 4, has to heat the injector 9 that carries out an indirect injection, then the pressure of the fuel inside the common rail 16 is low. In this case, the common rail 16 receives the fuel upstream of the high pressure feeding pump 14A and downstream from a low pressure pump 14B. Instead, according to a different embodiment, not illustrated, if the common rail 16 has to feed the injector 11 that carries out direct injection, then the pressure of the fuel inside the common rail 16 is high. In this case, the common rail 16 receives the fuel downstream of the high pressure pump 14A and upstream of the heating device 13.

According to what is illustrated in FIG. 4, the internal combustion engine 1 is also provided with the exhaust gas recirculation system EGR. In this case, the internal combustion engine 1 will operate with a globally lean combustion and the excess air will be partially replaced by the cooled exhaust gases. Therefore, the system EGR will have a dedicated cooler. The exhaust gas recirculation system EGR comprises an EGR pipe and an EGR valve. Through heat exchange with the exhaust gases that flow through the exhaust gas recirculation EGR pipe it is possible to heat the fuel drawn from the tank S. The fraction F1 of the quantity Q of fuel is fed through the common rail 16 arranged along the feed line to the injector 9 without being subjected to heating of any kind. Instead, the fraction F2 of the quantity Q of fuel is heated by the heating device 13, and is subsequently fed to the common rail 15 and finally is injected under pressure into the cylinder 2 through the injector 8. In particular, the heating device is provided with a heat exchanger 13A an and electric heater 13B. The heat exchanger 13A uses part of the heat of the exhaust gases that flow through the EGR pipe, by which the fraction F2 of the quantity Q of fuel is heated. The electric heater 13B (which can, for example, be an induction heater), is instead configured to carry out supplementary heating of the fraction F2 of the quantity Q of fuel. In other words, the electric heater 13B is configured to compensate heating of the fraction F2 of the quantity Q of fuel, in the case in which the heat exchanger 13A is not present or does not heat the fraction F2 of the quantity Q of fuel sufficiently. Therefore, in cases in which the heat exchanged with the exhaust gas inside the heat exchanger 13A is not sufficient to heat the fraction F2 of the quantity Q of fuel to the injection temperature T, the electric heater 13B is activated and will heat the fraction F2 of the quantity Q of fuel, so as to take it to the predetermined injection temperature T.

FIG. 5 illustrates the fuel injector 8. The fuel injector 8 is provided with an axis X of symmetry and comprises a main body 17 which houses an actuator 18 moving a plunger 19 and a spray tip 20 housing the end part of the plunger 19. The fuel injector 8 also comprises an injection valve 21 controlled by the movement of the plunger 19 and the heating device 12. In particular, the heating device 12 is arranged in the area of the spray tip 20 of the fuel injector 8 and is adapted to heat the fuel to be injected.

According to a possible embodiment, the heating device 12 heats the spray tip 20 of the fuel injector 8, which in turn heats by conduction the fuel flowing through the spray tip 20. In this case, the heating device 12 could comprise thermistors that generate heat due to the Joule effect in proximity of the spray tip 20 of the fuel injector 8; alternatively, the heating device 12 could comprise an inductor that heats the spray tip 20 of the fuel injector 8 by induction. In this embodiment, the heating device 12 obligatorily heats all the fuel flowing through the fuel injector 8, as the thermal inertias do not allow heating of only a part of the fuel flowing through the fuel injector 8.

According to a different embodiment, the heating device 12 of the fuel injector 8 generates electromagnetic waves, which interact with the fuel flowing through the spray tip 20 of the fuel injector 8 to (directly) heat the fuel. In particular, the heating device 12 can comprise an electromagnetic induction heater (that generates an electromagnetic field variable in time and that propagates in the form of electromagnetic waves) or the heating device 12 can comprise a microwave heater that generates electromagnetic waves that heat the fuel. In this embodiment, the heating device 12 can heat only a part of the fuel flowing through the fuel injector 8, or can heat only the fraction F2 of the quantity Q of fuel, as by heating the fuel directly it can be switched on and off very rapidly.

In FIG. 5, the heating device 12 is illustrated as been applied externally to the spray tip 20 of the fuel injector 8; however, the heating device 12 could also be integrated (embedded) in the spray tip 20 of the fuel injector 8.

According to a different embodiment, not illustrated, the heating device 12 is arranged in proximity of the fuel injector 8. In other words, in this embodiment the heating device 12 is not applied externally to the spray tip 20 of the fuel injector 8, but is arranged in proximity of the fuel injector 8. This solution would allow the heating device 12 to be shared with several fuel injectors 8 of the same cylinder head of the internal combustion engine 1.

If injection of the fractions F1 e F2 of the quantity Q of fuel is carried out by the fuel injectors 8 and 9, then only the fuel injector 8 is provided with the heating device 12, so as to heat the fraction F2 of the quantity Q of fuel to the injection temperature T.

Likewise, if injection of the fractions F1 and F2 of the quantity Q of fuel to be injected is carried out by the injectors 8 and 11, only the fuel injector 8 is provided with the heating device 12, so as to heat the fraction F2 of the quantity Q of fuel to the injection temperature T.

The method to control the combustion of the compression ignition internal combustion engine 1 with reactivity control through the injection temperature described above has a plurality of advantages. In particular, it allows the use of high compression ratios in gasoline powered internal combustion engines, without the occurrence of undesirable detonation phenomena; this leads to an increased efficiency (which is over 45%) of the internal combustion engine 1.

Moreover, emissions of polluting gases produced by the internal combustion engine 1 described above are also greatly reduced. The reduction of particulate emissions is due to a low level of stratification of the mixture (due to the fraction F2 of the quantity Q of fuel subsequently injected); instead, the reduction of $NO_x$ emissions is obtained as a result of the fact that the combustion temperature is low (due to the homogeneity of the fraction F1 of the quantity Q of fuel initially injected). In fact, low temperature combustion has reduced heat transfer to the walls of the combustion chamber C and therefore has high thermal efficiencies. The average ratio of the air-fuel mixture will be much higher than the stoichiometric ratio. The lean mixture (i.e. with little fuel) ensures low maximum temperature values in the combustion chamber C during combustion, resulting in reduced $NO_x$ formation. If desired, this makes it possible to avoid post treatment of the exhaust gas.

Stratification of the fuel in the cylinder 2, in terms of reactivity, leads to an acceptable pressure gradient. Therefore, the high reactivity of the injected fuel and the high injection temperature T of the fraction F2 of the quantity Q of fuel, allows the self-ignition delay of the charge to be determined with certainty. The reactivity is a function of the rpm and of the load condition of the internal combustion engine 1. Therefore, stratification of the charge has various advantages with respect to prior art internal combustion engines, in which the charge is homogeneous.

In the case in which the internal combustion engine 1 is provided with the exhaust gas recirculation system EGR, to obtain the reduction of $NO_x$ emissions, it would be possible to carry out prior mixing of the intake air with the exhaust (cooled if necessary) with the intention of decreasing the combustion temperature both in partially loaded and in fully loaded conditions.

In the case in which the internal combustion engine 1 is supercharged, this intake could take place in the intake plenum (high pressure and drawn upstream of the turbine) or before the compressor (low pressure drawn downstream of the turbine).

The advantage of being able to use a lower quality gasoline, with a low octane number and a limited quantity of additives (or no additives), is not to be underestimated.

A further advantage lies in the fact that, unlike compression ignition internal combustion engines (i.e. GCI engines), the control method proposed can also be carried out using commercial gasolines with a high octane number. Therefore, it is not necessary to use special fuels with a low octane number (for example, with a value of 70) that are not currently available on the market and that are necessary for compression ignition internal combustion engines (i.e. GCI engines) that also use injection pressures of over 1000 bar.

Through the fractionated injection of the present invention a single fuel (i.e. gasoline) and therefore a single fuel feed system, is used.

Finally, the feed pressure of the fuel in the cylinder 2 (by the fuel injector 8) is relatively low (below 500 bar).

The internal combustion engine 1 described above uses gasoline as fuel; naturally, the internal combustion engine 1 described above could use, in place of gasoline, another type of fuel similar to gasoline (i.e. with a low cetane number at room temperature). For example, as a result of the use of the high injection temperature T, the use of bio-components in gasolines for compression ignition engines is simplified, as the bio components tend to increase the octane number and therefore the resistance to self-ignition.

The use of a single type of fuel for both injections simplifies the layout of the internal combustion engine 1 without having the redundancy of: separate tanks, separate pumps, etc. Moreover, it is also possible to use a low pressure injection system (typically below 500 bar).

Advantageously, the possibility of varying the reactivity allows control of combustion to be simplified with respect to prior art internal combustion engines with homogeneous injection (i.e. without stratification), providing an advantage in terms of analogous thermal efficiency. Therefore, the reactivity stratification decreases the pressure gradient in self-ignition conditions and therefore allows the gradual involvement of different parts of the charge in the combustion chamber C.

The method of controlling the combustion of the compression injection internal combustion engine 1 with reactivity control through the injection temperature also improves low temperature combustion control. Therefore, it is possible to significantly reduce exhaust gas emissions, so as to significantly reduce (or even eliminate) exhaust gas post-treatment systems.

The invention claimed is:

1. A method to control the combustion of a compression ignition internal combustion engine (1) with reactivity control through the injection temperature; the internal combustion engine (1) is provided with at least one piston (7), which slides, with a reciprocating motion, on the inside of a cylinder (2), so as to carry out a succession of combustion cycles, each comprising at least an intake stroke and a compression stroke; the control method comprises the steps of:
  establishing, for each combustion cycle, a quantity (Q) of fuel to be injected into the cylinder (2); and
  injecting a first fraction (F1) of the quantity (Q) of fuel at least partially during the intake and/or compression stroke;
  injecting a second fraction (F2) of the quantity (Q) of fuel, which is equal to the remaining fraction of the quantity (Q) of fuel, into the cylinder (2) only at the end of the compression stroke and after the injection of the first fraction (F1) of the quantity (Q) of fuel; and
  heating the second fraction (F2) of the quantity (Q) of fuel to an injection temperature (T) of over 100° before injecting the second fraction (F2) of the quantity (Q) of fuel;
  wherein the first fraction (F1) is injected by means of a first fuel injector (9; 11) that receives the fuel from a first feed system without active heating devices so that the fraction (F1) of the quantity (Q) of fuel has a temperature below the injection temperature (T);
  wherein the second fraction (F2) of the quantity (Q) of fuel is injected by means of a second fuel injector (8) that is different and independent from the first fuel injector (9; 11), is injected directly into the cylinder (2), and receives the fuel from a second feed system that is separate and independent from the first feed system and wherein the second feed system is provided with at least one active heating device (12; 13) that is operated to give the fuel the injection temperature (T).

2. A method to control an internal combustion engine (1) according to claim 1, wherein the first fuel injection (9) injects outside the cylinder into an intake pipe (10) of the cylinder (2).

3. A method to control an internal combustion engine (1) according to claim 1, wherein the first fuel injector (11) injects directly into the cylinder (2).

4. A method to control an internal combustion engine (1) according to claim 3, wherein:
  the second fuel injector (8) and the first fuel injector (11) both lead into the top end of the cylinder (2) so as to inject centrally into the combustion chamber (C); and
  the second fuel injector (8) and the first fuel injector (11) are arranged next to one another.

5. A method to control an internal combustion engine (1) according to claim 3, wherein the first fuel injector (11) leads into a lateral wall of the cylinder (2) so as to lead into the combustion chamber (C), in a lateral position.

6. A method to control an internal combustion engine (1) according to claim 1, wherein the heating device (12) is coupled to the second fuel injector (8).

7. A method to control an internal combustion engine (1) according to claim 1, wherein the heating device (13) is arranged downstream from a feeding pump (14) and upstream from the second fuel injector (8).

8. A method to control an internal combustion engine (1) according to claim 7, wherein:
  the internal combustion engine (1) comprises an exhaust gas recirculation system (EGR) provided with an (EGR) pipe; and
  the heating device (13) is provided with a heat exchanger (13A), which uses part of the heat from the exhaust gases flowing through the (EGR) pipe to heat the second fraction (F2) of the quantity (Q) of fuel, and with an electric heater (13B).

9. A method to control an internal combustion engine (1) according to claim 7, wherein a common rail (15) is provided, which feeds fuel under pressure to the second fuel injector (8), and the heating device (13) is arranged upstream from the common rail (15).

10. A method to control an internal combustion engine (1) according to claim 6, wherein:
  the second fuel injector (8) comprises a main body (17), which houses an actuator (18) moving a plunger (19) and a spray tip (20) housing the end part of the plunger (19), and an injection valve (21), which is controlled by the movement of the plunger (19);
  the heating device (12) is arranged in the area of the spray tip (20) of the second fuel injector (8);
  and the heating device (12) heats the spray tip (20) of the second fuel injector (8), which, in turn, heats by conduction the fuel flowing through the spray tip (20).

11. A method to control an internal combustion engine (1) according to claim 6, wherein:
  the second fuel injector (8) comprises a main body (17), which houses an actuator (18) moving a plunger (19) and a spray tip (20) housing the end part of the plunger (19), and an injection valve (21), which is controlled by the movement of the plunger (19);
  the heating device (12) is arranged in the area of the spray tip (20) of the second fuel injector (8); and
  the heating device (12) generates electromagnetic waves, which interact with the fuel flowing through the spray tip (20) of the second fuel injector (8), so as to heat the fuel.

12. A method to control an internal combustion engine (1) according to claim 1, wherein the second fraction (F2) of the quantity (Q) of fuel is injected into the cylinder (2) at the end of the compression stroke and at no more than 60° from the top dead centre (TDC).

13. A method to control an internal combustion engine (1) according to claim 1, wherein the first fraction (F1) of the quantity (Q) of fuel is injected partly during the intake stroke and, for the remaining part, during the compression stroke.

14. A method to control an internal combustion engine (1) according to claim 1, wherein the internal combustion engine (1) is not provided with a spark plug and the fuel spontaneously self-ignites on the inside of the cylinder (2) at the end of the compression stroke.

15. A method to control an internal combustion engine (1) according to claim 1, wherein the fractionation of the quantity (Q) of fuel to be injected into the cylinder (2) is established as a function of the load condition.

16. A method to control an internal combustion engine (1) according to claim 1, wherein the value of the fractions (F1, F2) of the quantity (Q) of fuel and the related point in time in which the injections are carried out are established as a function of the rpm of the internal combustion engine (1), the load condition, and the injection temperature (T).

17. A method to control an internal combustion engine (1) according to claim 1, wherein the value of the injection temperature (T) is established both as a function of the fuel used and as a function of the working conditions.

18. A method to control an internal combustion engine (1) according to claim 1, wherein the first fraction (F1) of the quantity (Q) of fuel is equal to at least 70% of the quantity (Q) of fuel and the second fraction (F2) of the quantity (Q) of fuel is less than 30% of the quantity (Q) of fuel.

19. A method to control an internal combustion engine (1) according to claim 1, wherein:
the fuel is gasolines with a high octane number; and
the internal combustion engine (1) operates without an ignition spark plug thanks to a self-ignition of the charge of fuel contained in the combustion chamber (C).

20. A method to control the combustion of a compression ignition internal combustion engine (1) with reactivity control through the injection temperature;
the internal combustion engine (1) is provided with at least one piston (7), which slides, with a reciprocating motion, on the inside of a cylinder (2), so as to carry out a succession of combustion cycles, each comprising at least an intake stroke and a compression stroke;
the control method comprises the steps of:
establishing, for each combustion cycle, a quantity (Q) of fuel to be injected into the cylinder (2); and
injecting a first fraction (F1) of the quantity (Q) of fuel at least partially during the intake and/or compression stroke;
injecting a second fraction (F2) of the quantity (Q) of fuel, which is equal to the remaining fraction of the quantity (Q) of fuel, into the cylinder (2) only at the end of the compression stroke and after the injection of the first fraction (F1) of the quantity (Q) of fuel; and
heating the second fraction (F2) of the quantity (Q) of fuel to an injection temperature (T) of over 100° before injecting the second fraction (F2) of the quantity (Q) of fuel;
wherein the first fraction (F1) is injected by means of a first fuel injector (9; 11) that receives the fuel from a first feed system without active heating devices so that the fraction (F1) of the quantity (Q) of fuel has a temperature below the injection temperature (T);
wherein the second fraction (F2) of the quantity (Q) of fuel is injected by means of a second fuel injector (8) that is different and independent from the first fuel injector (9; 11), injected directly into the cylinder (2), and receives the fuel from a second feed system that is separate and independent from the first feed system;
wherein the second feed system is provided with at least one active heating device (12; 13) that is operated to give the fuel the injection temperature (T); and
wherein the first fraction (F1) of the quantity (Q) of fuel is equal to at least 70% of the quantity (Q) of fuel and the second fraction (F2) of the quantity (Q) of fuel is less than 30% of the quantity (Q) of fuel.

21. A method to control the combustion of a compression ignition internal combustion engine (1) with reactivity control through the injection temperature;
the internal combustion engine (1) is provided with at least one piston (7), which slides, with a reciprocating motion, on the inside of a cylinder (2), so as to carry out a succession of combustion cycles, each comprising at least an intake stroke and a compression stroke;
the control method comprises the steps of:
establishing, for each combustion cycle, a quantity (Q) of fuel to be injected into the cylinder (2); and
injecting a first fraction (F1) of the quantity (Q) of fuel at least partially during the intake and/or compression stroke;
injecting a second fraction (F2) of the quantity (Q) of fuel, which is equal to the remaining fraction of the quantity (Q) of fuel, into the cylinder (2) only at the end of the compression stroke and after the injection of the first fraction (F1) of the quantity (Q) of fuel; and
heating the second fraction (F2) of the quantity (Q) of fuel to an injection temperature (T) of over 100° before injecting the second fraction (F2) of the quantity (Q) of fuel;
wherein the first fraction (F1) is injected by means of a first fuel injector (9; 11) that receives the fuel from a first feed system without active heating devices so that the fraction (F1) of the quantity (Q) of fuel has a temperature below the injection temperature (T);
wherein the second fraction (F2) of the quantity (Q) of fuel is injected by means of a second fuel injector (8) that is different and independent from the first fuel injector (9; 11), injected directly into the cylinder (2), and receives the fuel from a second feed system that is separate and independent from the first feed system;
wherein the second feed system is provided with at least one active heating device (12; 13) that is operated to give the fuel the injection temperature (T); and
wherein the value of the fractions (F1, F2) of the quantity (Q) of fuel are established as a function of the rpm of the internal combustion engine (1), the load condition, and the injection temperature (T).

* * * * *